(12) United States Patent
Chen

(10) Patent No.: US 6,518,954 B1
(45) Date of Patent: Feb. 11, 2003

(54) SENSITIVE AND SHORT HEIGHT POINTING DEVICE

(75) Inventor: Wei-Ting Chen, Taipei (TW)

(73) Assignee: Darfon Electronics Corp., Taoyuan (TW)

( * ) Notice: Subject to any disclaimer, the term of this patent is extended or adjusted under 35 U.S.C. 154(b) by 0 days.

(21) Appl. No.: 09/559,586

(22) Filed: Apr. 28, 2000

(30) Foreign Application Priority Data

May 4, 1999 (TW) .................................... 88206987 U

(51) Int. Cl.[7] .................................................. G09G 5/08
(52) U.S. Cl. ........................ 345/161; 345/157; 345/160
(58) Field of Search ................................. 345/157, 160, 345/161

(56) References Cited

U.S. PATENT DOCUMENTS 5,640,178 A * 6/1997 Endo et al. ................ 345/161
6,121,954 A * 9/2000 Seffernick ................. 345/161
6,184,865 B1 * 2/2001 Zimmerman et al. ....... 345/160
6,195,082 B1 * 2/2001 May et al. ................. 345/161
6,243,077 B1 * 6/2001 Manara et al. ............. 345/157
6,313,762 B1 * 11/2001 Crowley et al. ............ 345/168
2002/0075234 A1 * 6/2002 Poole ....................... 345/161

* cited by examiner

*Primary Examiner*—Bipin Shalwala
*Assistant Examiner*—David L Lewis
(74) *Attorney, Agent, or Firm*—Troxell Law Office PLLC

(57) ABSTRACT

A sensitive and small pointing device includes a substrate, a sensing member having at least one cantilever arm and a rubber member for shrouding the sensing member on the substrate. The rubber member may be deformed under an external force and induces the cantilever arm to produce strain which results in strain signal generation. The rubber member may produce greater dimensional change when being squeezed. The cantilever arm is resilient and may generate greater strain while receiving force from the rubber member. Hence, the pointing device may have higher sensitivity, produce greater strain and be made at a shorter height.

7 Claims, 4 Drawing Sheets

SENSITIVE AND SHORT HEIGHT POINTING DEVICE

FIELD OF THE INVENTION

This invention relates to a pointing device and more particularly to a sensitive and short height pointing device that is still able to generate sufficient strain.

BACKGROUND OF THE INVENTION

Index input devices are widely used in various types of input devices such as control panels, keyboards, remote control devices and other electronic devices. The index input device may be in the form of a mouse, a joy stick, a touch pad, a track ball, a pointing stick and the like. The basic principle of the index input device is to generate analog signals based on strain resulting from force applied on the index device in a selected direction. The analog signal output is then used by a computer for performing a required function. In the market, the pointing bar can be found in some notebook computers. It is generally located between keys in the keyboard. Through the strain incurred, the respective user's application direction and the strength may be thus realized by the computer to further determine the moving direction and distance of the cursor.

In the development of pointing bar means, how to increase force sensitivity to thus reduce the required force for generating signals is a highly focused subject. Eudo et al disclose in U.S. Pat. No. 5,640,178 a pointing bar means generally shown in FIG. 7. As shown, the pointing bar means has a resilient bracket 1 mounted on a base 6 above a recess 6A by means of a plurality of fasteners 7. Above the bracket 1, a bar 2 is provided. Below the bottom surface of the bracket 1, a plurality of strain gauges 3 are provided. When the bar 2 receives an external force, the bracket 1 above the recess 6A is deformed, and the strain gauges 3 sense the strain resulting from the deformation to produce analog signals.

Since the bar 2 has to receive the external force and the bracket 1 has to be screwed to the base 6 by the fasteners 7, the whole structure of the pointing bar means becomes complicated and has an excessive height. Furthermore, the strain being produced is small due to the fasteners 7 tight fastening of the bracket 1; i.e., the strain gauge 3 cannot produce sufficient strain. Therefore, overall sensitivity of the pointing bar means is thus very low.

SUMMARY OF THE INVENTION

In view of aforesaid disadvantages, it is an object of this invention to provide a sensitive and short height pointing device that has a simple structure with cantilever arms for generating sufficient strain to enhance operation sensitivity.

The pointing device according to this invention includes a substrate, a sensing member and a rubber member for shrouding the sensing member over the substrate. The sensing member has at least one protrusive cantilever arm upon which a strain signal generator can be located. When the rubber member subjects to an external force, the rubber member is then squeezed and deformed, and consequently induces respective strain in the cantilever arm. The strain signal generator then senses the strain and produces signal output.

In one aspect of this invention, the strain signal generator is preferably located adjacent to one end of the cantilever arm, either at an upper surface or a lower surface of the arm for producing analog signals resulting from the strain in the arm. The strain signal generator may be a strain gauge, a piezoelectric member and the like.

In one embodiment of this invention, a separator may be sandwiched between the sensing member and the substrate for the cantilever arm to have a larger deforming space thereunder. The separator may be a circuit board, a simple partition and the like which has a desired thickness. The separator has a smaller surface dimension than the sensing member for the cantilever arm to maintain suspending condition relative to the substrate. The substrate may have an opening under the cantilever arm so that the rubber member may be deformed easier while subjected to an external force.

In another embodiment of this invention, the sensing member and the substrate may be integrally formed together by pressing operation or by adhering the sensing member to the substrate. The cantilever arm may be made by pressing or formed an angle against the substrate surface. The substrate may also have an opening formed below the cantilever arm to enable the rubber member be squeezed and deformed easily.

The rubber member is elastic and can be deformed to a substantial extend under external force. It may be made of rubber, rubber sheet and the like.

BRIEF DESCRIPTION OF THE DRAWINGS

The invention, as well as its many advantages, may be further understood by the following detailed description and drawings in which.

DETAILED DESCRIPTION OF THE PREFERRED EMBODIMENT

Figure 1:
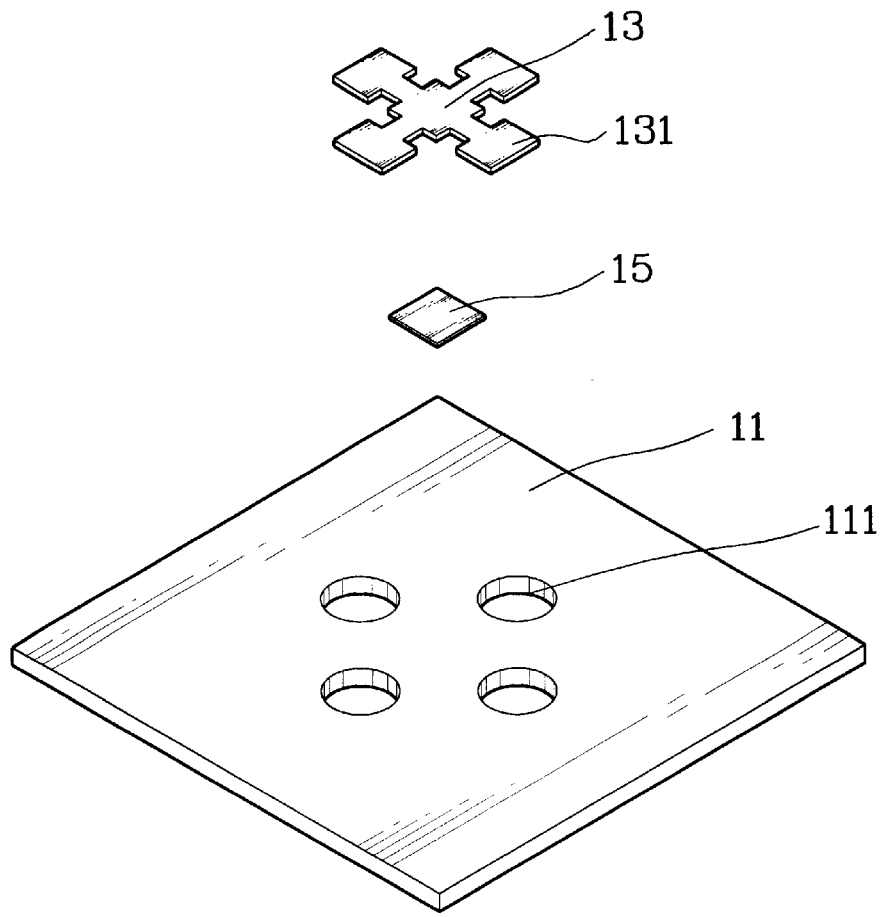
FIG. 1 is a general exploded view of a first embodiment of this invention.
Figure 2:
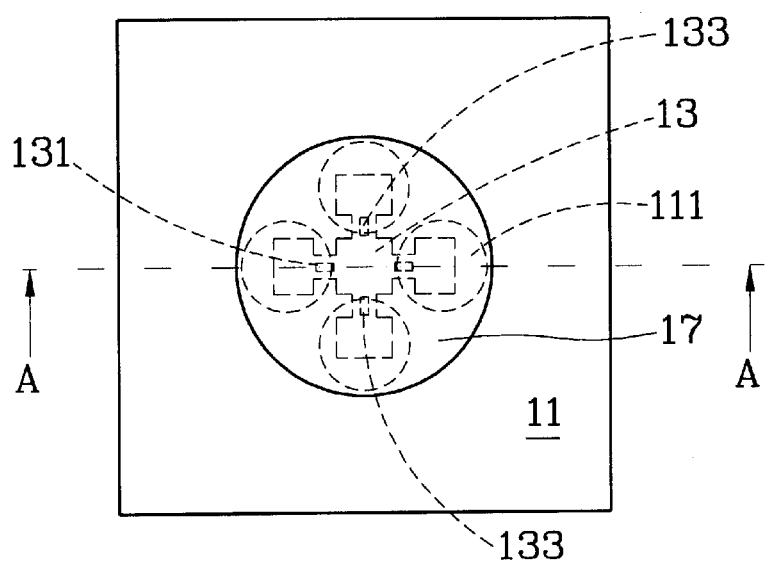
FIG. 2 is a top view of this invention.
Figure 3:
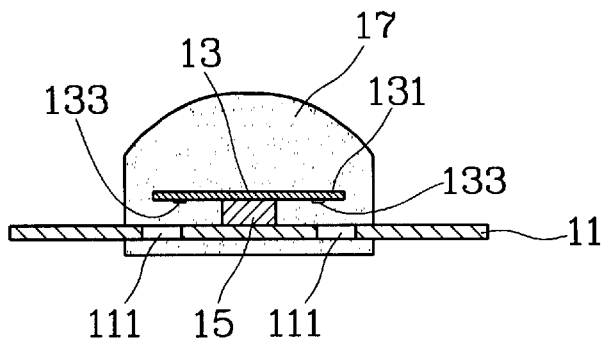
FIG. 3A is a sectional view of this invention taken on line A—A in FIG.2.
FIG. 3B is a sectional view of the embodiment shown in FIG. 3A under an external force.
Figure 3:
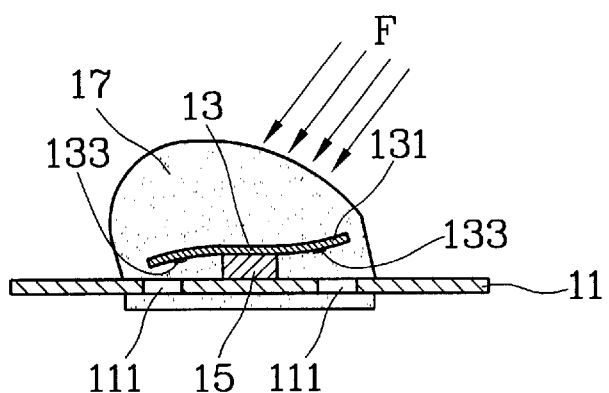

Referring now to FIGS. 1, 2 and 3A, the first embodiment of this invention includes a substrate 11 which has a plurality of openings 111 formed therein, a sensing member 13 which constitutes a plurality of protrusive cantilever arms 131, and a rubber member 17 which shrouds the sensing member 13 upon the substrate 11. In the first embodiment, the sensing member 13 is flat and has four cantilever arms 131. On each cantilever arm 131, a strain signal generator 133 is disposed thereon.

The substrate 11 is made of material which has rigidity property desired for withstanding the force applied upon the rubber member 17. The cantilever arm 131 is resilient and may be deformed under external forcing to incur strain therein.

The strain signal generator 133 may be located on an upper or lower surface of the cantilever arm 131 for sensing the strain incurred to the cantilever arm 131 and to produce analog signals. In the first embodiment, the strain signal generator 133 is located under a neck section of the cantilever arm 131 which may thus produce greater strain when deformed. The strain signal generator 133 of the present invention may be a strain gauge, a piezoelectric member and the like.

In the first embodiment, there is also provided with a separator 15 located between the sensing member 13 and the substrate 11 so that the sensing member 13 can be spaced from the substrate top surface for the cantilever arm 131 to have more deformation room for generating sufficient strain and stronger signals. The separator 15 is smaller in size than the sensing member 13 so that the cantilever arm 131 may remain suspending against the substrate top surface. According to the present invention, the separator 15 may be a circuit board, a partition and the like which has a desired thickness.

The rubber member 17 is a soft plastic material and may be deformed to a large degree while withstanding an external force. It may be made of rubber, rubber sheet and the like. As shown, the rubber member 17 may shroud and cover the entire sensing member 13 and part of the substrate 11 around and below the sensing member 13 (as shown in FIG. 3A). It may also cover only the sensing member 13 or be formed in other shape as long as the cantilever arm 131 may be deformed under external force from the pressed rubber member 17.

In the first embodiment, the opening 111 is located below the cantilever arm 131. When the rubber member 17 is being pressed, the squeezed rubber may be pushed into the opening 111 so that the cantilever arm 131 may have greater deformation for generating greater strain.

FIG. 3B shows the first embodiment in use. When an external force F is applied to the rubber member 17, the deformed rubber member 17 causes the cantilever arms 131 to deform into different degree and directions. The strain resulting from the deformation of the cantilever arms 131 can be transmitted to an electric circuit (not shown in the figures) for further processing and determining cursor moving direction and distance, or for other usage.

Figure 4:
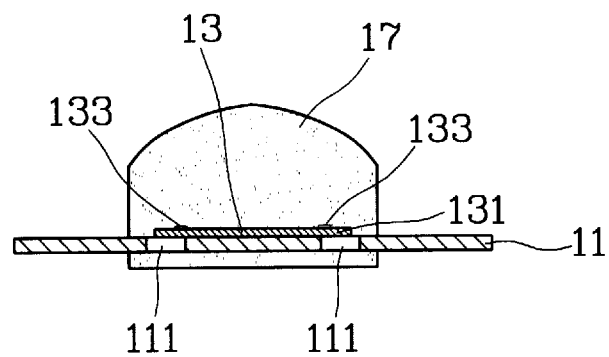
FIG. 4 is a sectional view of a second embodiment of this invention.

FIG. 4 depicts a second embodiment of this invention. It is largely constructed similar to the first embodiment shown in FIG. 3A except that the separator 15 in the previous embodiment is removed and the strain signal generator 133 is located directly on an upper surface of the cantilever arm 131. The sensing member 13 may be adhered to the substrate 11 to form an integral member. The cantilever arm 131 can also be located above the opening 111.

Figure 5:
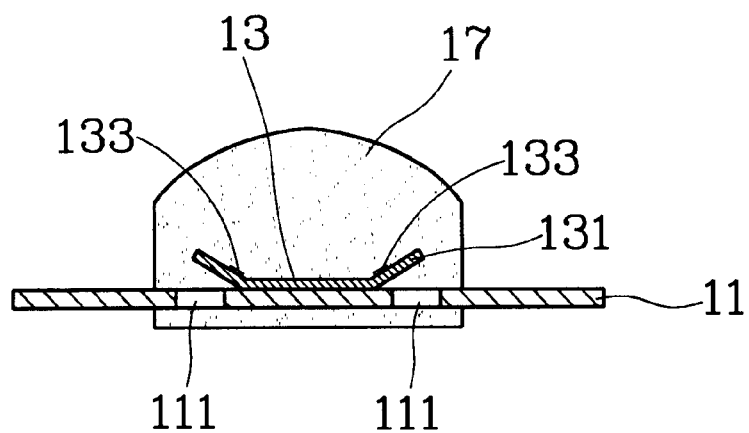
FIG. 5 is a sectional view of a third embodiment of this invention.

FIG. 5 shows a third embodiment which is largely like the second embodiment shown in FIG. 4. However, the cantilever arm 133 is tilted upward at a predetermined angle leaving the top surface of the substrate 11. The strain signal generator 133 is preferably located at the juncture of the tilted and non-tilted section of the cantilever arm 131.

Figure 6:
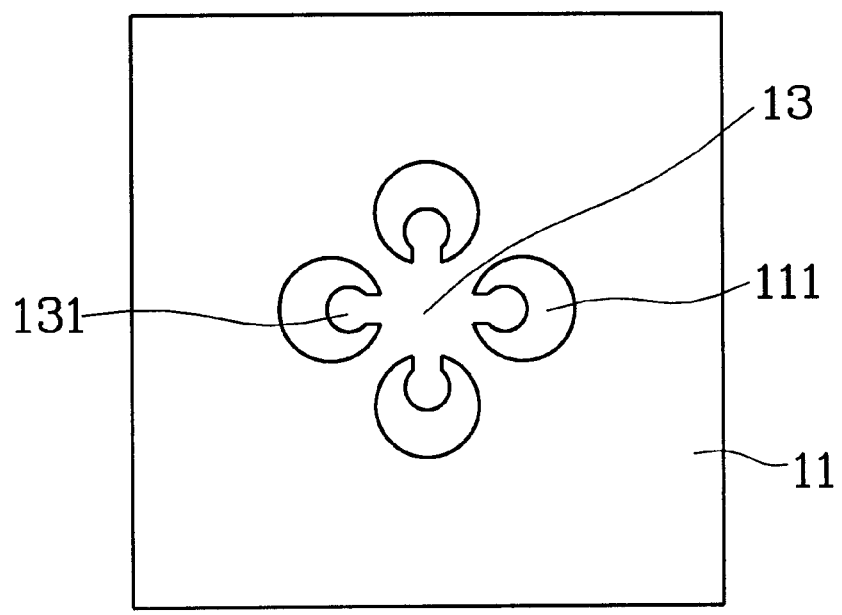
FIG. 6 is a top view of a substrate of a fourth embodiment of this invention.
Figure 7:
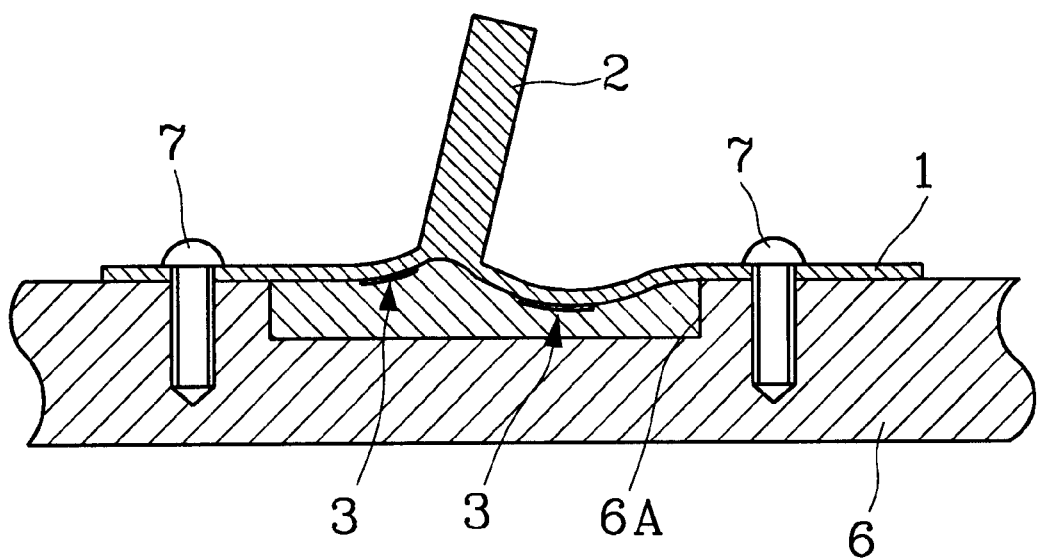
FIG. 7 is a sectional view of a conventional pointing device.

FIG. 6 illustrates the substrate 11 of a fourth embodiment of this invention. The sensing member 13 and the substrate 11 are made of same material. The cantilever arm 131 can be manufactured by punching operation and is located in the opening 111. The rubber member 17 (not shown in the figures) may be located above the sensing member 13. The strain signal generator (also not shown in the figures) may be located above or below the cantilever arm 131.

The strain signals generated in this invention are transmitted through electric circuits to other devices for further process. The electric circuits and their function are known in the art and form not part of this invention, hence will be omitted herein.

Through the design and structure set forth above, the rubber member may cover and protect the sensing member and the strain signal generator. Because of material characteristics of the rubber member and the protrusive cantilever arm, the pointing device may become more sensitive and short in height.

It may thus be seen that the objects of the present invention set forth herein, as well as those made apparent from the foregoing description, are efficiently attained. While the preferred embodiment of the invention have been set forth for purpose of disclosure, modifications of the disclosed embodiment of the invention as well as other embodiment thereof may occur to those skilled in the art. Accordingly, the appended claims are intended to cover all embodiments which do not depart from the spirit and scope of the invention.

What is claimed is:

1. A pointing device with enhanced sensitivity comprising:
    a) a substrate having at least one opening therethrough;
    b) a sensing member including at least one protruding cantilever arm having a distal end aligned with the at least one opening so as to be movable relative to the substrate;
    c) a strain signal generator on the at least one protruding cantilever arm; and,
    d) a deformable rubber member covering the sensing member such that a force exerted on the deformable rubber member induces a strain in the at least one protruding cantilever arm thereby causing the strain signal generator to produce a strain signal.

2. The pointing device of claim 1 wherein the substrate has a plurality of holes and the sensing member has a plurality of protruding cantilever arms, each having a distal end aligned with one of the plurality of openings.

3. The pointing device of claim 1 wherein the sensing member comprises a flat center portion, the at least one protruding cantilever arm extending outwardly from the flat center portion.

4. The pointing device of claim 3 further comprising a separator member mounted between the flat center portion and the substrate.

5. The pointing device of claim 3 wherein the at least one protruding cantilever arm extends obliquely from the flat center portion.

6. The pointing device of claim 1 wherein the strain signal generator is mounted on a lower surface of the at least one protruding cantilever arm.

7. The pointing device of claim 1 wherein the strain signal generator is mounted on an upper surface of the at least one protruding cantilever arm.

* * * * *